United States Patent
Lee et al.

(10) Patent No.: US 8,497,923 B2
(45) Date of Patent: Jul. 30, 2013

(54) METHOD OF PROCESSING IMAGE SIGNALS USING INTERPOLATION TO ADDRESS BAD PIXEL DATA AND RELATED METHOD OF IMAGE CAPTURE

(75) Inventors: Pyeong-Woo Lee, Seoul (KR);
Dong-Jae Lee, Osan-si (KR);
Byung-Joon Baek, Goyang-si (KR);
Tae-Chan Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 162 days.

(21) Appl. No.: 13/103,253

(22) Filed: May 9, 2011

(65) Prior Publication Data
US 2011/0273580 A1     Nov. 10, 2011

(30) Foreign Application Priority Data
May 10, 2010   (KR) .................. 10-2010-0043412

(51) Int. Cl.
*H04N 9/64* (2006.01)
(52) U.S. Cl.
USPC ........................................................ 348/247

(58) Field of Classification Search
USPC .................................................. 348/246, 247
See application file for complete search history.

(56) References Cited

U.S. PATENT DOCUMENTS

| | | | |
|---|---|---|---|
| 5,805,216 A * | 9/1998 | Tabei et al. .................. 348/246 |
| 8,208,044 B2 * | 6/2012 | Atanassov et al. ............ 348/241 |
| 2005/0219390 A1 * | 10/2005 | Tajima et al. ................. 348/246 |
| 2007/0030229 A1 | 2/2007 | Liu |
| 2008/0174683 A1 * | 7/2008 | Kiba et al. .................... 348/246 |
| 2008/0278609 A1 * | 11/2008 | Otsuki .......................... 348/247 |

FOREIGN PATENT DOCUMENTS

| | | |
|---|---|---|
| KR | 1020020017802 A | 3/2002 |
| KR | 1020070012129 A | 1/2007 |
| KR | 1020080015545 A | 2/2008 |

* cited by examiner

*Primary Examiner* — John Villecco
(74) *Attorney, Agent, or Firm* — Volentine & Whitt, PLLC

(57) ABSTRACT

A method of processing image signals comprises determining whether each of multiple units of input pixel data received from an image sensor is bad pixel data generated by a bad pixel of the image sensor or normal pixel data generated by a normal pixel of the image sensor, and performing interpolation to generate image data corresponding to the bad pixel using only normal pixel data and omitting bad pixel data.

18 Claims, 11 Drawing Sheets

| X COORDINATE | Y COORDINATE |
|---|---|
| $X_1$ | $Y_1$ |
| $X_2$ | $Y_2$ |
| ⋮ | ⋮ |
| $X_k$ | $Y_k$ |

FIG. 9
| G P00 | B P01 | G P02 | B P03 | G P04 |
|---|---|---|---|---|
| R P10 | G P11 | R P12 | G P13 | R P14 |
| G P20 | B P21 | G P22 | B P23 | G P24 |
| R P30 | G P31 | R P32 | G P33 | R P34 |
| G P40 | B P41 | G P42 | B P43 | G P44 |
FIG. 10A
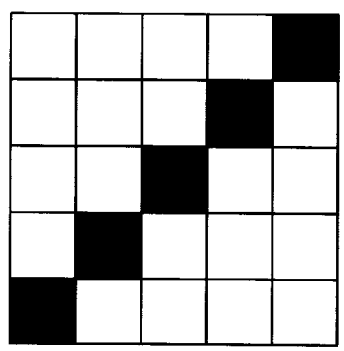
FIG. 10B
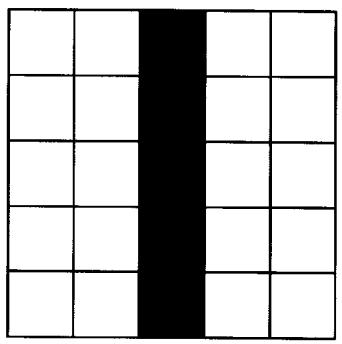

METHOD OF PROCESSING IMAGE SIGNALS USING INTERPOLATION TO ADDRESS BAD PIXEL DATA AND RELATED METHOD OF IMAGE CAPTURE

CROSS-REFERENCE TO RELATED APPLICATIONS

This application claims priority under 35 U.S.C. §119 to Korean Patent Application No. 10-2010-0043412 filed on May 10, 2010, the disclosure of which is hereby incorporated by reference in its entirety.

BACKGROUND OF THE INVENTION

Embodiments of the inventive concept relate generally to imaging devices. More particularly, embodiments of the inventive concept relate to methods of capturing images and processing image signals in the imaging devices.

An imaging device comprises an image sensor that converts incident light into electrical signals. The electrical signals are then processed and captured as an image.

The image sensor converts the incident light into electrical signals using a plurality of pixel sensors, also referred to as pixels. These pixels, however, can include bad pixels that generate electric signals not accurately representing the incident light. To avoid data loss due to bad pixels, the electrical signals from neighboring pixels can be interpolated to generate pixel data for bad pixels. However, where one or more of the neighboring pixels is also a bad pixel, the interpolation may produce distorted results.

SUMMARY OF THE INVENTION

According to one embodiment of the inventive concept, a method of processing image signals comprises determining whether each of multiple units of input pixel data received from an image sensor is bad pixel data generated by a bad pixel of the image sensor or normal pixel data generated by a normal pixel of the image sensor, and performing interpolation to generate image data corresponding to the bad pixel using only normal pixel data and omitting bad pixel data.

According to another embodiment of the inventive concept, a method of capturing an image comprises determining whether each of multiple units of input pixel data received from an image sensor is bad pixel data generated by a bad pixel of the image sensor or normal pixel data generated by a normal pixel of the image sensor, and performing interpolation to generate interpolated data corresponding to the bad pixel using only normal pixel data, and combining the interpolated data with the input pixel data to form interpolated input pixel data. The method further comprises generating red-green-blue (RGB) data by performing a de-mosaicing operation on the interpolated input pixel data, and displaying the RGB data on a display device.

According to another embodiment of the inventive concept, a method of processing image signals comprises generating a kernel comprising current pixel data and a plurality of neighbor pixel data centered around the current pixel data, determining whether the current pixel data is bad pixel data, and upon determining that the current pixel data is bad pixel data, estimating the current pixel data using only normal pixel data based on a pattern direction in which an image is oriented in the kernel.

These and other embodiments of the inventive concept can allow interpolation to be performed without distortion by avoiding the use of bad pixel data in estimating current pixel data.

BRIEF DESCRIPTION OF THE DRAWINGS

The drawings illustrate selected embodiments of the inventive concept. In the drawings, like reference numbers indicate like features.

FIG. 9 is a diagram illustrating a kernel used in the interpolation unit of FIG. 5.

FIGS. 10A, 10B, 10C, and 10D are diagrams illustrating examples of the kernel of FIG. 9 in images taken by an image sensor.

DETAILED DESCRIPTION

Embodiments of the inventive concept are described below with reference to the accompanying drawings. These embodiments are presented as teaching examples and should not be construed to limit the scope of the inventive concept.

In the description that follows, the terms first, second, third, etc., are used to describe various features. However, these terms should not be construed to limit the described features, but are used merely to distinguish between different features. Accordingly, a first feature discussed below could alternatively be termed a second feature without departing from the scope of the inventive concept. As used herein, the term "and/or" encompasses any and all combinations of one or more of the associated listed items.

Where a feature is referred to as being "connected" or "coupled" to another feature, it can be directly connected or coupled to the other feature or intervening features may be present. In contrast, where an element is referred to as being "directly connected" or "directly coupled" to another feature, there are no intervening features present. Other words used to describe the relationship between features should be interpreted in a similar fashion (e.g., "between" versus "directly between," "adjacent" versus "directly adjacent," etc.).

The terminology used herein is for the purpose of describing particular embodiments and is not intended to limit the inventive concept. The singular forms "a," "an" and "the" are intended to encompass the plural forms as well, unless the context clearly indicates otherwise. The terms "comprises" and/or "comprising," as used in this description, indicate the presence of stated features, but do not preclude the presence or addition of other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
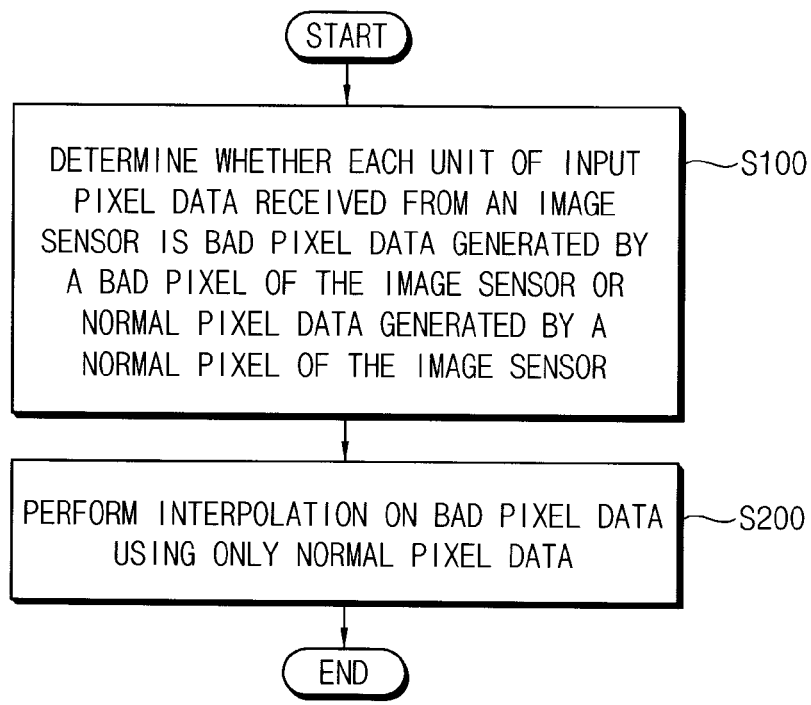
FIG. 1 is a flowchart illustrating a method of processing image signals according to an embodiment of the inventive concept.

FIG. 1 is a flowchart illustrating a method of processing image signals according to an embodiment of the inventive concept. In the description that follows, example method steps are indicated by parentheses (SXXX).

Referring to FIG. 1, the method begins by determining whether each of multiple units of input pixel data received from an image sensor is bad pixel data generated by a bad pixel of the image sensor or normal pixel data generated by a normal pixel of the image sensor (S100). Hereinafter, bad pixel data is pixel data generated by a bad pixel of the image sensor, and normal pixel data is pixel data generated by a normal pixel of the image sensor. Each unit of input pixel data is identified as bad pixel data or normal pixel data using coordinates of bad pixels stored in a non-volatile memory device. Interpolation is performed on bad pixel data using only normal pixel data included in the plurality of input pixel data (S200).

Pixel data can be generated for bad pixels by interpolating normal pixel data from pixels neighboring the bad pixels. However, where some of the neighboring pixels are bad pixels, a resulting image may be distorted. Accordingly, in certain embodiments of the inventive concept, a method of processing image signals performs interpolation on bad pixel data using only normal pixel data generated by normal pixels neighboring the bad pixel. As a result, the method can correctly interpolate bad pixel data even where multiple bad pixels are located next to each other in the image sensor.

Figure 2:
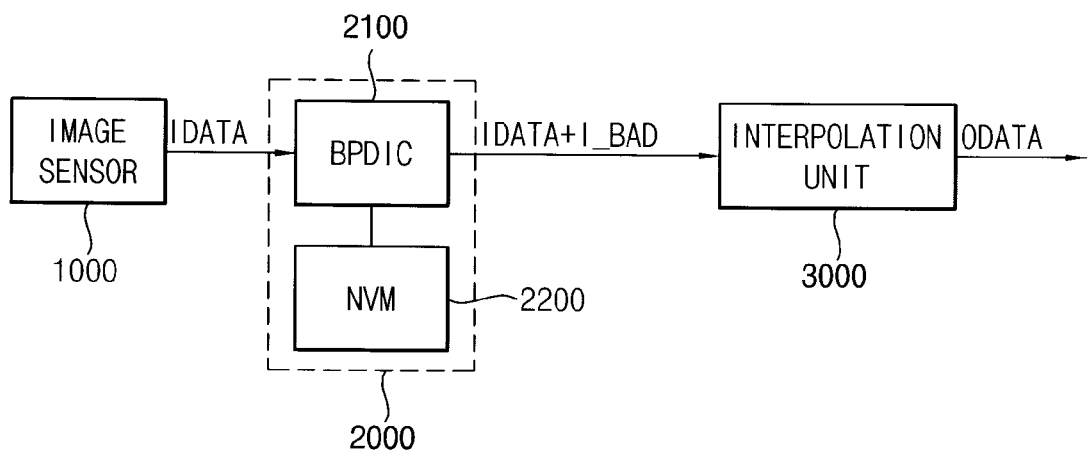
FIG. 2 is a block diagram illustrating an image signal-processing device according to an embodiment of the inventive concept.

FIG. 2 is a block diagram illustrating an image signal-processing device 10 according to an embodiment of the inventive concept.

Referring to FIG. 2, image signal-processing device 10 comprises an image sensor 1000, a bad pixel data determination unit 2000, and an interpolation unit 3000.

Image sensor 1000 comprises a pixel array comprising a plurality of pixels. The pixels in image sensor 1000 generate input pixel data IDATA by transforming incident light into electric signals representing an image. Image sensor 1000 can comprise, for instance, a complementary metal-oxide semiconductor (CMOS) sensor or a charge coupled device (CCD) sensor.

Bad pixel data determination unit 2000 determines whether each unit of input pixel data IDATA received from image sensor 1000 is bad pixel data generated by a bad pixel of image sensor 1000 or normal pixel data generated by a normal pixel of image sensor 1000. Bad pixel data determination unit 2000 adds a bad pixel indication bit I_BAD to each unit of input pixel data IDATA to indicate whether it is bad pixel data or normal pixel data.

Interpolation unit 3000 performs interpolation on bad pixel data among input pixel data IDATA using only normal pixel data included in input pixel data IDATA and generates output pixel data ODATA based on the interpolation.

Bad pixel data determination unit 2000 comprises a bad pixel data indication circuit 2100 and a non-volatile memory device 2200.

Figures 3, 4:
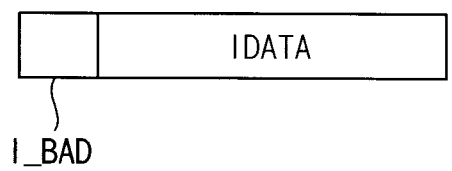
FIG. 3 is a diagram for describing data stored in a non-volatile memory device in the image signal-processing device of FIG. 2.
FIG. 4 is a diagram for describing operations of a bad pixel data indication circuit in the image signal-processing device of FIG. 2.

FIG. 3 is a diagram for describing data stored in non-volatile memory device 2200 in image signal-processing device 10 of FIG. 2.

Referring to FIG. 3, non-volatile memory device 2200 stores coordinates of bad pixels of image sensor 1000. In particular, non-volatile memory device 2200 stores "x" coordinates x1 through xk of bad pixels and "y" coordinates y1 through yk of bad pixels, where k is a positive integer.

As will be described below, interpolation can be performed in various ways according to whether two or more bad pixels are located contiguously in image sensor 1000. Non-volatile memory device 2200 typically stores a coordinate of a bad pixel where at least one additional bad pixel is located in an area of n×n pixels (n>2) centered around the bad pixel. Otherwise, non-volatile memory device 2200 does not store a coordinate of the bad pixel.

FIG. 4 is a diagram for describing operations of bad pixel data indication circuit 2100 in image signal-processing device 10 of FIG. 2.

Referring to FIGS. 2 and 4, bad pixel data indication circuit 2100 determines whether each unit of input pixel data IDATA received from image sensor 1000 is bad pixel data or normal pixel data based on the coordinates of bad pixels of image sensor 1000 stored in non-volatile memory device 2200. Bad pixel data indication circuit 2100 adds a bad pixel indication bit I_BAD to each unit of input pixel data IDATA to indicate whether each unit of input pixel data IDATA is bad pixel data or normal pixel data. For example, bad pixel data indication circuit 2100 adds bad pixel indication bit I_BAD having a first value where a unit of input pixel data IDATA is bad pixel data, and adds bad pixel indication bit I_BAD having a second value where a unit of input pixel data IDATA is normal pixel data.

In the example of FIG. 4, bad pixel indication bit I_BAD is added as a most significant bit. However, in some embodiments, bad pixel indication bit I_BAD is added as a least significant bit or in the middle of input pixel data IDATA. In other embodiments, bad pixel indication bit I_BAD is provided as a separate signal.

Figure 5:
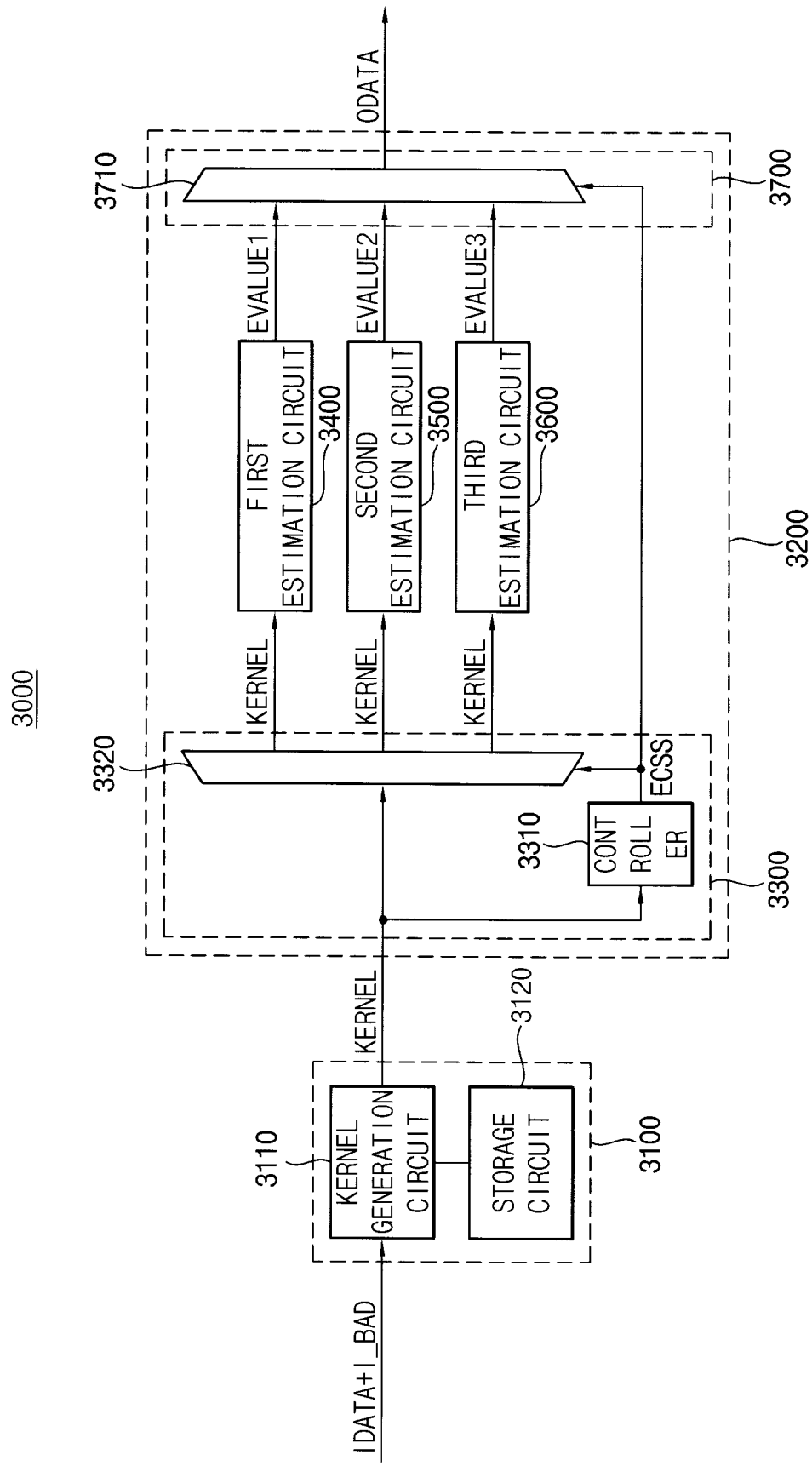
FIG. 5 is a block diagram illustrating an embodiment of an interpolation unit in the image signal-processing device of FIG. 2.

FIG. 5 is a block diagram illustrating an embodiment of interpolation unit 3000 in image signal-processing device 10 of FIG. 2.

Referring to FIG. 5, interpolation unit 3000 comprises a kernel generation unit 3100 and an interpolation circuit 3200.

Kernel generation unit 3100 generates a kernel comprising a current pixel data and a plurality of neighbor pixel data centered around the current pixel data. The current pixel data and the plurality of neighbor pixel data are included in input pixel data IDATA. The current pixel data is pixel data that is currently being processed.

Kernel generation unit 3100 comprises a kernel generation circuit 3110 and a storage circuit 3120.

Kernel generation circuit 3110 buffers input pixel data IDATA, each unit of which has an additional bad pixel indication bit I_BAD, in storage circuit 3120. Kernel generation circuit 3110 generates the kernel by selecting n×n input pixel data IDATA among the buffered input pixel data such that the current pixel data is located in the center of the selected n×n input pixel data. Kernel generation circuit 3110 consecutively generates the kernel by consecutively selecting one pixel data among the plurality of the buffered input pixel data as the current pixel data. The kernel can have various sizes, e.g., 5×5, 7×7, etc. In FIG. 5, storage circuit 3120 is illustrated as a separate circuit from kernel generation circuit 3110. In some embodiments, storage circuit 3120 is included in kernel generation circuit 3110.

Interpolation circuit 3200 interpolates the current pixel data based on whether the current pixel data is bad pixel data or normal pixel data, and outputs the interpolated current pixel data as output pixel data ODATA.

Interpolation circuit 3200 comprises an input control circuit 3300, a first estimation circuit 3400, a second estimation circuit 3500, a third estimation circuit 3600, and an output control circuit 3700.

Input control circuit 3300 selectively provides the kernel received from kernel generation unit 3100 to one of first estimation circuit 3400, second estimation circuit 3500 and, third estimation circuit 3600 based on whether the current pixel data and the plurality of neighbor pixel data is bad pixel data or normal pixel data. Input control circuit 3300 comprises a controller 3310 and a demultiplexer 3320.

Controller 3310 receives the kernel from kernel generation unit 3100 and determines whether the current pixel data and each of the plurality of neighbor pixel data are bad pixel data or normal pixel data, based on bad pixel indication bit I_BAD added to the current pixel data and each of the plurality of neighbor pixel data.

Controller 3310 generates an estimation circuit selection signal ECSS with a first value where the current pixel data is bad pixel data. Controller 3310 generates estimation circuit selection signal ECSS with a second value where the current pixel data is normal pixel data and at least one of the plurality of neighbor pixel data is bad pixel data. Controller 3310 generates estimation circuit selection signal ECSS with a third value where the current pixel data is normal pixel data and all of the neighbor pixel data are normal pixel data.

Demultiplexer 3320 receives the kernel from kernel generation unit 3100 and provides the kernel to first estimation circuit 3400 where estimation circuit selection signal ECSS has the first value. Demultiplexer 3320 provides the kernel to second estimation circuit 3500 where estimation circuit selection signal ECSS has the second value. Demultiplexer 3320 provides the kernel to third estimation circuit 3600 where estimation circuit selection signal ECSS has the third value.

Figure 6A:
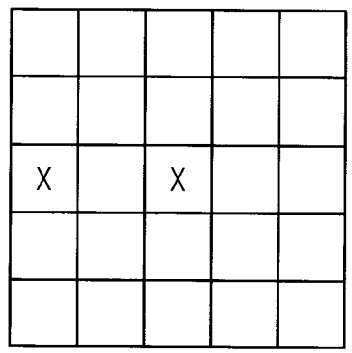
FIGS. 6A, 6B, and 6C are diagrams for describing operations of an input control circuit in the interpolation unit of FIG. 5.
Figure 6B:
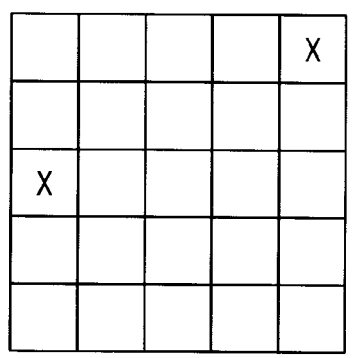
Figure 6C:
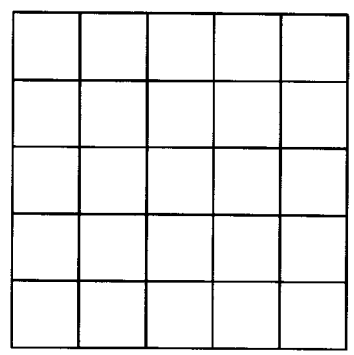

FIGS. 6A, 6B, and 6C are diagrams for describing operations of input control circuit 3300 in interpolation unit 3000 of FIG. 5.

FIGS. 6A, 6B and 6C each illustrate an example where kernel has a size of 5×5. In FIGS. 6A, 6B and 6C, cells with an "X" sign represent bad pixel data and cells without the X sign represent normal pixel data.

In the example of FIG. 6A the current pixel data is bad pixel data. In the example of FIG. 6B, the current pixel data is normal pixel data and at least one of the neighbor pixel data is bad pixel data. In the example of FIG. 6C, the current pixel data is normal pixel data and all of the neighbor pixel data are normal pixel data.

As described with reference to FIG. 3, non-volatile memory device 2200 stores a coordinate of a bad pixel only where at least one additional bad pixel is located in an area of n×n pixels centered around the bad pixel in image sensor 1000, and does not store a coordinate of a bad pixel where no additional bad pixel is located in the area of n×n pixels centered around the bad pixel. Therefore, as illustrated in FIG. 6A, where the current pixel data of the kernel is bad pixel data, at least one of the neighbor pixel data of the kernel is bad pixel data.

Input control circuit 3300 provides the kernel to first estimation circuit 3400. First estimation circuit 3400 estimates the current pixel data based on a pattern direction, in which an image taken by image sensor 1000 is oriented in the kernel, and generates a first estimated value EVALUE1 of the current pixel data. The operation of first estimation circuit 3400 is described in further detail below with reference to FIG. 7.

As illustrated in FIG. 6B, where the current pixel data of the kernel is normal pixel data and at least one unit of neighbor pixel data is bad pixel data, the current pixel data is generated by a normal pixel of image sensor 1000. In this case, input control circuit 3300 provides the kernel to second estimation circuit 3500. Second estimation circuit 3500 outputs the current pixel data without any modification as a second estimated value EVALUE2 of the current pixel data.

As illustrated in FIG. 6C, where the current pixel data of the kernel is normal pixel data and all neighbor pixel data is normal pixel data, the current pixel data is generated by the bad pixel of image sensor 1000 or it is generated by the normal pixel of image sensor 1000. Input control circuit 3300 then provides the kernel to third estimation circuit 3600.

Third estimation circuit 3600 estimates the current pixel data based on differences between a value of the current pixel data and values of the neighbor pixel data and generates a third estimated value EVALUE3 of the current pixel data. For example, third estimation circuit 3600 determines the current pixel data as bad pixel data where an average of the differences between the value of the current pixel data and the values of the plurality of neighbor pixel data is equal to or greater than a critical value, estimates the current pixel data using the plurality of neighbor pixel data, and generates third estimated value EVALUE3 of the current pixel data.

Third estimation circuit 3600 identifies the current pixel data as normal pixel data where the average of the differences between the value of the current pixel data and the values of the plurality of neighbor pixel data is smaller than the critical value, and outputs the current pixel data as it is without any estimation as third estimated value EVALUE3 of the current pixel data.

Referring again to FIG. 5, output control circuit 3700 outputs one of first estimated value EVALUE1, second estimated value EVALUE2, and third estimated value EVALUE3 as output pixel data ODATA according to estimation circuit selection signal ECSS received from input control circuit 3300. Output control circuit 3700 comprises a multiplexer 3710. Multiplexer 3710 receives first estimated value EVALUE1 from first estimation circuit 3400, second estimated value EVALUE2 from second estimation circuit 3500, third estimated value EVALUE3 from third estimation circuit 3600, and estimation circuit selection signal ECSS from input control circuit 3300. Multiplexer 3710 outputs first estimated value EVALUE1 as output pixel data ODATA where estimation circuit selection signal ECSS has the first value. Multiplexer 3710 outputs second estimated value EVALUE2 as output pixel data ODATA where estimation circuit selection signal ECSS has the second value. Multiplexer 3710 outputs third estimated value EVALUE3 as output pixel data ODATA where estimation circuit selection signal ECSS has the third value.

Figure 7:
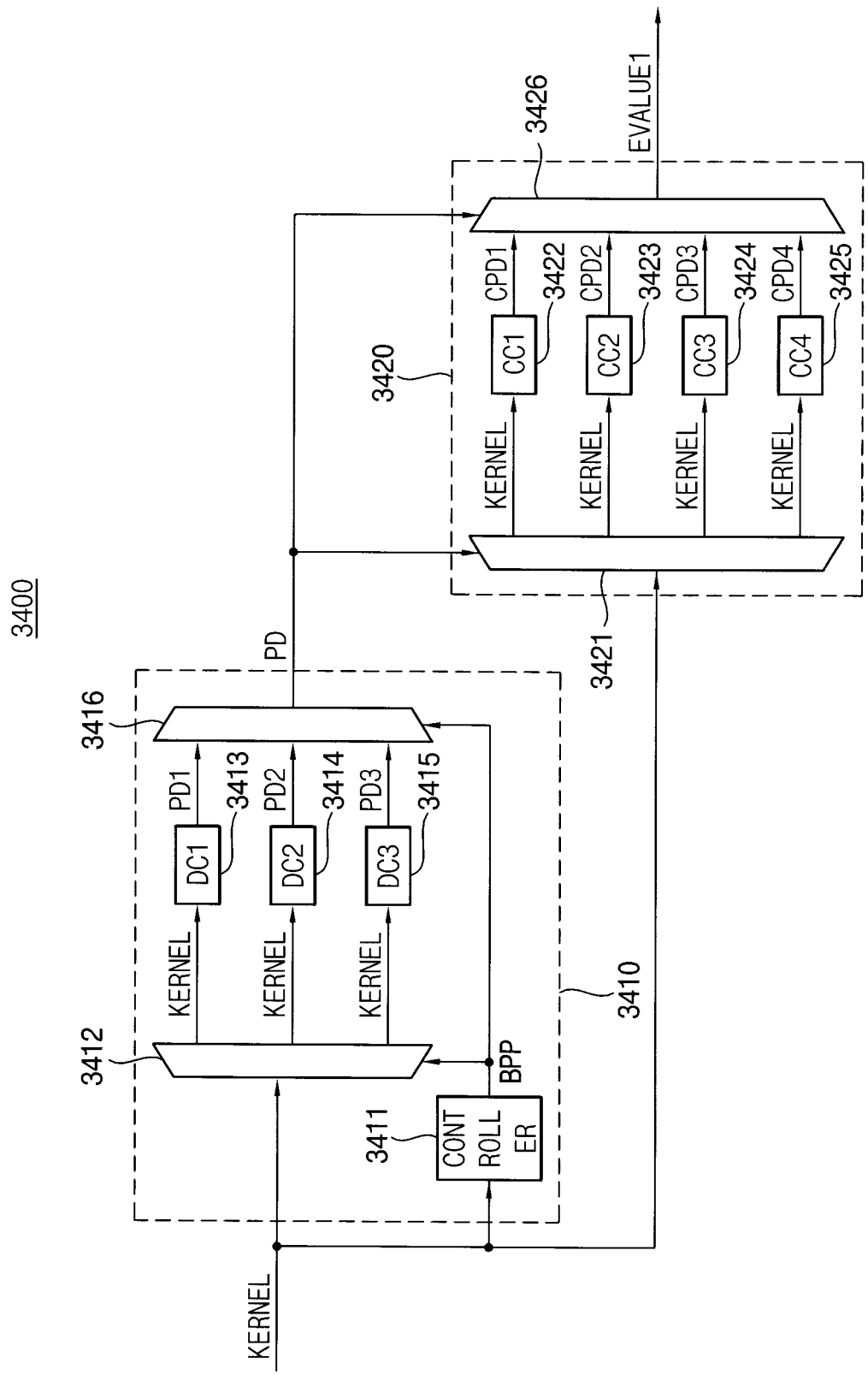
FIG. 7 is a block diagram illustrating an embodiment of a first estimation circuit in the interpolation unit of FIG. 5.

FIG. 7 is a block diagram illustrating an embodiment of first estimation circuit 3400 in interpolation unit 3000 of FIG. 5.

Referring to FIG. 7, first estimation circuit 3400 comprises a pattern direction determination circuit 3410 and an estimated value calculation circuit 3420. Pattern direction determination circuit 3410 receives the kernel from input control circuit 3300, determines the pattern direction in which the image taken by image sensor 1000 is oriented in the kernel, based on differences between values of neighbor pixel data in the kernel, and generates a pattern direction signal PD representing the pattern direction.

Estimated value calculation circuit 3420 calculates first estimated value EVALUE1 using only normal pixel data located in the pattern direction among the plurality of neighbor pixel data.

Pattern direction determination circuit 3410 comprises a controller 3411, a demultiplexer 3412, a first determination circuit 3413, a second determination circuit 3414, a third determination circuit 3415, and a multiplexer 3416.

Controller 3411 receives the kernel from input control circuit 3300. Controller 3411 determines a bad pixel location pattern that represents a location of bad pixel data in the kernel and generates a bad pixel location pattern signal BPP representing a bad pixel location pattern. Controller 3411 determines the bad pixel location pattern using bad pixel indication bit I_BAD added to each of the plurality of neighbor pixel data.

Controller 3411 determines the bad pixel location pattern as one of an adjacent pattern, a horizontal-vertical pattern, and a diagonal pattern. Controller 3411 determines the bad pixel location pattern as the adjacent pattern where bad pixel data is located within a predetermined distance from the current pixel data, and generates bad pixel location pattern signal BPP having a first value.

Controller 3411 determines the bad pixel location pattern as the horizontal-vertical pattern where bad pixel data is located at least the predetermined distance apart in a horizontal direction or in a vertical direction from the current pixel data, and generates bad pixel location pattern signal BPP having a second value.

Controller 3411 determines the bad pixel location pattern as the diagonal pattern where bad pixel data is located at least the predetermined distance apart in a diagonal direction from the current pixel data, and generates bad pixel location pattern signal BPP having a third value.

In some embodiments, controller 3411 determines the bad pixel location pattern as one of the horizontal-vertical pattern and the diagonal pattern according to a predetermined order of priority where bad pixel data is located at least the predetermined distance apart in a direction other than a horizontal direction, a vertical direction, and a diagonal direction from the current pixel data.

In some embodiments, controller 3411 determines the bad pixel location pattern as one of the adjacent pattern, the horizontal-vertical pattern, and the diagonal pattern on which a majority of bad pixel data are located where more than two units of the neighbor pixel data are bad pixel data.

Figure 8A:
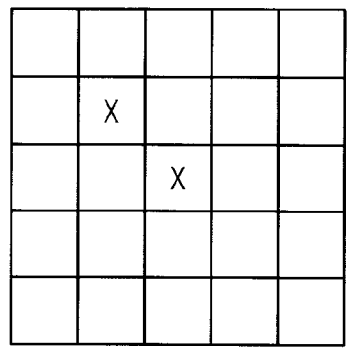
FIGS. 8A, 8B, and 8C are diagrams for describing operations of a controller in the first estimation circuit of FIG. 7.
Figure 8B:
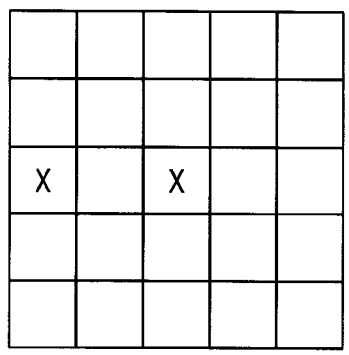
Figure 8C:
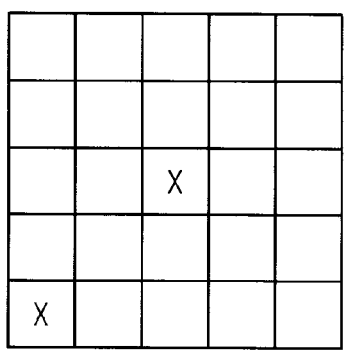

FIGS. 8A, 8B and 8C are diagrams for describing operations of controller 3411 in first estimation circuit 3400 of FIG. 7. FIGS. 8A, 8B and 8C illustrate kernels having a size of 5×5. In FIGS. 8A, 8B and 8C, cells with the X sign represent bad pixel data and cells without X sign represent normal pixel data.

FIG. 8A illustrates a kernel for which controller 3411 determines the bad pixel location pattern as the adjacent pattern. FIG. 8B represents a kernel for which controller 3411 determines the bad pixel location pattern as the horizontal-vertical pattern. FIG. 8C represents a kernel for which controller 3411 determines the bad pixel location pattern as the diagonal pattern.

As described with reference to FIG. 5, input control circuit 3300 provides the kernel to first estimation circuit 3400 where the current pixel data of the kernel is bad pixel data. Therefore, the current pixel data of the kernel received by controller 3411 in first estimation circuit 3400 is always bad pixel data.

As illustrated in FIG. 8A, where bad pixel data is located within one pixel from the current pixel data, controller 3411 determines the bad pixel location pattern as the adjacent pattern. As illustrated in FIG. 8B, where bad pixel data is located at a distance of one pixel in a horizontal direction or in a vertical direction from the current pixel data, controller 3411 determines the bad pixel location pattern as the horizontal-vertical pattern. As illustrated in FIG. 8C, where bad pixel data is located one pixel apart in a diagonal direction from the current pixel data, controller 3411 determines the bad pixel location pattern as the diagonal pattern.

Referring again to FIG. 7, demultiplexer 3412 receives the kernel from input control circuit 3300 and receives bad pixel location pattern signal BPP from controller 3411. Demultiplexer 3412 provides the kernel to first determination circuit 3413 if bad pixel location pattern signal BPP has the first value. Demultiplexer 3412 provides the kernel to second determination circuit 3414 if bad pixel location pattern signal BPP has the second value. Demultiplexer 3412 provides the kernel to third determination circuit 3415 if bad pixel location pattern signal BPP has the third value.

Each of first determination circuit 3413, second determination circuit 3414, and third determination circuit 3415 selects neighbor pixel data that is not located in the bad pixel location pattern among the plurality of neighbor pixel data, decides the pattern direction such that an average of differences between values of pixel data, which are located in the pattern direction among the selected neighbor pixel data, is minimized, and generates a first pattern direction signal PD1, a second pattern direction signal PD2, and a third pattern direction signal PD3, respectively, that represent the pattern direction.

The bad pixel location pattern of the kernel that is provided to first determination circuit 3413 is the adjacent pattern. Therefore, first determination circuit 3413 determines the pattern direction using only pixel data not located within the predetermined distance from the current pixel data among the plurality of neighbor pixel data in order to prevent bad pixel data from influencing the determination of the pattern direction.

The bad pixel location pattern of the kernel provided to second determination circuit 3414 is the horizontal-vertical pattern. Therefore, second determination circuit 3414 determines the pattern direction using only pixel data not located the predetermined distance apart in a horizontal direction or in a vertical direction from the current pixel data among the plurality of neighbor pixel data in order to prevent bad pixel data from influencing the determination of the pattern direction.

The bad pixel location pattern of the kernel provided to third determination circuit 3415 is the diagonal pattern. Therefore, third determination circuit 3415 determines the pattern direction using only pixel data not located at least the predetermined distance apart in a diagonal direction from the current pixel data among the plurality of neighbor pixel data in order to prevent bad pixel data from influencing on determining the pattern direction.

Each of first determination circuit 3413, second determination circuit 3414, and third determination circuit 3415 calculates a first average of differences between values of pixel data located in a first diagonal direction among the selected neighbor pixel data, a second average of differences between values of pixel data located in a vertical direction among the selected neighbor pixel data, a third average of differences between values of pixel data located in a second diagonal direction perpendicular to the first diagonal direction, among the selected neighbor pixel data, and a fourth average of differences between values of pixel data located in a horizontal direction among the selected neighbor pixel data.

Each of first determination circuit 3413, second determination circuit 3414, and third determination circuit 3415 sets the first diagonal direction as the pattern direction where the first average is the smallest among the first average, the second average, the third average, and the fourth average. Each of first determination circuit 3413, second determination circuit 3414, and third determination circuit 3415 sets the vertical direction as the pattern direction when the second average is the smallest among the first average, the second average, the third average, and the fourth average. Each of first determination circuit 3413, second determination circuit 3414 and third determination circuit 3415 may set the second diagonal direction as the pattern direction when the third average is the smallest among the first average, the second average, the third average, and the fourth average.

Each of first determination circuit 3413, second determination circuit 3414, and third determination circuit 3415 sets the horizontal diagonal direction as the pattern direction when the fourth average is the smallest among the first average, the second average, the third average, and the fourth average. The first diagonal direction is a forty-five degree diagonal direction from the current pixel data and the second diagonal direction is a one hundred thirty-five degree diagonal direction from the current pixel data.

Each of first determination circuit 3413, second determination circuit 3414, and third determination circuit 3415 calculates the first average, the second average, the third average, and the fourth average by putting a relatively large weight on a difference between values of pixel data relatively close to the current pixel data and putting a relatively small weight on a difference between values of pixel data more distant from the current pixel data.

FIG. 9 is a diagram illustrating an embodiment of a kernel used in interpolation unit 3000 of FIG. 5.

In the embodiment of FIG. 9, the kernel has a size of 5×5. In FIG. 9, the labels Pij represent values of corresponding pixel data. "R" indicates red pixel data, "G" represents green pixel data, and "B" represents blue pixel data. In FIG. 9, the current pixel data is green, and a value of the current pixel data is P22.

FIGS. 10A, 10B, 10C, and 10D are diagrams illustrating examples of the kernel of FIG. 9 in different images taken by image sensor 1000.

Figure 10C:
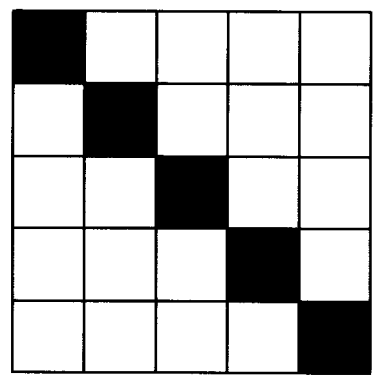
Figure 10D:
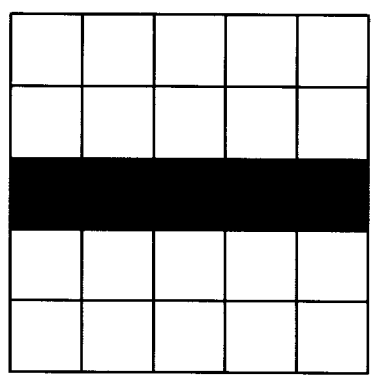

In FIG. 10A, the image taken by image sensor 1000 is oriented in a forty-five degree diagonal direction in the kernel. In FIG. 10B, the image taken by image sensor 1000 is oriented in a vertical direction in the kernel. In FIG. 10C, the image taken by image sensor 1000 is oriented in a one hundred thirty-five degree diagonal direction in the kernel. In FIG. 10D, the image taken by image sensor 1000 is oriented in the horizontal direction in the kernel.

Hereinafter, operations of first determination circuit 3413, second determination circuit 3414, and third determination circuit 3415 will be described with reference to FIGS. 9, 10A, 10B, 10C, and 10D.

First determination circuit 3413 selects neighbor pixel data not located within the distance of one pixel from the current pixel data among the plurality of neighbor pixel data. In particular, first determination circuit 3413 selects pixel data other than pixel data P11, P12, P13, P21, P23, P31, P32, and P33. First determination circuit 3413 calculates a first average of differences between values of pixel data having a same color as the current pixel data and located in the forty-five degree diagonal direction among the selected neighbor pixel data, a second average of differences between values of pixel data having a same color as the current pixel data and located in the vertical direction among the selected neighbor pixel data, a third average of differences between values of pixel data having the same color as the current pixel data and located in the one hundred thirty-five degree diagonal direction among the selected neighbor pixel data, and a fourth average of differences between values of pixel data having the same color as the current pixel data and located in the horizontal direction among the selected neighbor pixel data. For example, first determination circuit 3413 may calculate the first average, the second average, the third average, and the fourth average using the following equations (1).

$$D45=(4*|P04-P40|+5*|P02-P20|+5*|P24-P42|+|P04-P20|+|P24-P40|)/16$$

$$D90=(|P00-P20|+|P20-P40|+|P00-P40|+|P04-P24|+|P24-P44|+|P04-P44|+2*|P02-P42|)/8$$

$$D135=(4*|P00-P44|+5*|P02-P24|+5*|P20-P42|+|P20-P44|+|P00-P24|)/16$$

$$D180=(|P00-P02|+|P02-P04|+|P00-P04|+|P40-P42|+|P42-P44|+|P40-P44|+2*|P20-P24|)/8 \quad \text{Equations (1)}$$

In equations (1), D45 represents the first average, D90 represents the second average, D135 represents the third average, and D180 represents the fourth average.

In equations (1), the first average, the second average, the third average, and the fourth average are calculated using only pixel data that have a same color (i.e., green) as the current pixel data. In some other embodiments, the first average, the second average, the third average, and the fourth average are calculated using not only pixel data having the same color as the current pixel data but also pixel data having other colors.

Equations (1) represent one example of calculations that first determination circuit 3413 can use to calculate the first average, the second average, the third average, and the fourth average. In other embodiments, first determination circuit 3413 can calculate the first average, the second average, the third average, and the fourth average in other ways. For example, first determination circuit 3413 can calculate the first average, the second average, the third average, and the fourth average using different weights than those shown in equations (1).

Where the image taken by image sensor 1000 is oriented in the forty-five degree diagonal direction in the kernel, the first average is generally smaller than the second through fourth averages. Where the image taken by image sensor 1000 is oriented in the vertical direction in the kernel, the second average is generally smaller than the first, third, and fourth averages. Where the image taken by image sensor 1000 is oriented in the one hundred thirty-five degree diagonal direction in the kernel, the third average is generally smaller than the first, second, and fourth averages. Where the image taken by image sensor 1000 is oriented in the horizontal direction in the kernel, the fourth average is smaller than the first through third averages.

First determination circuit 3413 sets the forty-five degree diagonal direction as the pattern direction where the first average is the smallest among the first average, the second average, the third average, and the fourth average, and generates first pattern direction signal PD1 with a first value. First determination circuit 3413 sets the vertical direction as the pattern direction where the second average is the smallest among the first average, the second average, the third average, and the fourth average, and generates first pattern direction signal PD1 with a second value. First determination circuit 3413 sets the one hundred thirty-five degree diagonal direction as the pattern direction where the third average is the smallest among the first average, the second average, the third average, and the fourth average, and generates first pattern direction signal PD1 with a third value. First determination circuit 3413 sets the horizontal direction as the pattern direction where the fourth average is the smallest among the first average, the second average, the third average, and the fourth average, and generates first pattern direction signal PD1 with a fourth value.

Second determination circuit 3414 selects neighbor pixel data that is not located one pixel apart in a horizontal direction or in a vertical direction from the current pixel data among the neighbor pixel data. That is, second determination circuit 3414 selects pixel data other than pixel data P02, P20, P42, and P24. Second determination circuit 3414 calculates the first average of differences between values of pixel data having the same color as the current pixel data and located in the forty-five degree diagonal direction among the selected neighbor pixel data, the second average of differences between values of pixel data having the same color as the current pixel data and located in the vertical direction among the selected neighbor pixel data, the third average of differences between values of pixel data having the same color as the current pixel data and located in the one hundred thirty-five degree diagonal direction among the selected neighbor pixel data, and the fourth average of differences between values of pixel data having the same color as the current pixel data and located in the horizontal direction among the selected neighbor pixel data. For example, second determination circuit 3414 may calculate the first average, the second average, the third average, and the fourth average using the following equations (2).

$$D45=(|P31\text{-}P40|+|P04\text{-}P13|+2*|P13\text{-}P31|)/4$$

$$D90=(|P00\text{-}P40|+|P04\text{-}P44|+3*|P11\text{-}P31|+3*|P13\text{-}P33|)/8$$

$$D135=(|P00\text{-}P11|+|P33\text{-}P44|+2*|P11\text{-}P33|)/4$$

$$D180=(|P00\text{-}P04|+|P40\text{-}P44|+3*|P11\text{-}P13|+3*|P31\text{-}P33|)/8 \quad \text{Equations (2)}$$

In equations (2), D45 represents the first average, D90 represents the second average, D135 represents the third average, and D180 represents the fourth average.

In equations (2), the first average, the second average, the third average, and the fourth average are calculated using only pixel data that have a same color (i.e., green) as the current pixel data. In some other embodiments, the first average, the second average, the third average, and the fourth average can be calculated using pixel data having the same color and different colors compared to the current pixel data.

Equations (2) represent one example of equations that second determination circuit 3414 can use to calculate the first average, the second average, the third average, and the fourth average. In other embodiments, second determination circuit 3414 can calculate the first average, the second average, the third average, and the fourth average in other ways. For example, second determination circuit 3414 can calculate the first average, the second average, the third average, and the fourth average using different weights from those used in equations (2).

Similar to first determination circuit 3413, second determination circuit 3414 sets the forty-five degree diagonal direction as the pattern direction where the first average is the smallest among the first average, the second average, the third average, and the fourth average, and generates second pattern direction signal PD2 with a first value. Second determination circuit 3414 sets the vertical direction as the pattern direction where the second average is the smallest among the first average, the second average, the third average, and the fourth average, and generates second pattern direction signal PD2 with a second value. Second determination circuit 3414 sets the one hundred thirty-five degree diagonal direction as the pattern direction where the third average is the smallest among the first average, the second average, the third average, and the fourth average, and generates second pattern direction signal PD2 with a third value. Second determination circuit 3414 sets the horizontal direction as the pattern direction where the fourth average is the smallest among the first average, the second average, the third average, and the fourth average, and generates second pattern direction signal PD2 with a fourth value.

Third determination circuit 3415 selects neighbor pixel data that are not located one pixel apart in a diagonal direction from the current pixel data among the plurality of neighbor pixel data. That is, third determination circuit 3415 selects pixel data other than pixel data P00, P04, P40, and P44. Third determination circuit 3415 calculates the first average of differences between values of pixel data having the same color as the current pixel data and located in the forty-five degree diagonal direction among the selected neighbor pixel data, the second average of differences between values of pixel data having the same color as the current pixel data and located in the vertical direction among the selected neighbor pixel data, the third average of differences between values of pixel data having the same color as the current pixel data and located in the one hundred thirty-five degree diagonal direction among the selected neighbor pixel data, and the fourth average of differences between values of pixel data having the same color as the current pixel data and located in the horizontal direction among the selected neighbor pixel data. For example, third determination circuit 3415 may calculate the first average, the second average, the third average, and the fourth average using the following equations (3).

$$D45=(|P02\text{-}P11|+|P11\text{-}P20|+|P24\text{-}P33|+|P33\text{-}P42|+2*|P13\text{-}P31|+|P13\text{-}P20|+|P24\text{-}P31|)/8$$

$$D90=(2*|P02\text{-}P42|+2*|P11\text{-}P31|+2*|P13\text{-}P33|)/8$$

$$D135=(|P02\text{-}P13|+|P13\text{-}P24|+|P20\text{-}P31|+|P31\text{-}P42|+|2*P11\text{-}P33|+|P20\text{-}P33|+|P11\text{-}P24|)/8$$

$$D180=(2*|P20\text{-}P24|+3*|P11\text{-}P13|+3*|P31\text{-}P33|+)/8 \quad \text{Equations (3)}$$

In equations (3), D45 represents the first average, D90 represents the second average, D135 represents the third average, and D180 represents the fourth average.

In equations (3), the first average, the second average, the third average, and the fourth average are calculated using only pixel data that have a same color (i.e., green) as the current pixel data. In some other embodiments, the first average, the second average, the third average, and the fourth average are calculated using not only pixel data having the same color as the current pixel data, but also pixel data that have other colors.

Equations (3) represent one example of calculations that third determination circuit 3415 can use to calculate the first average, the second average, the third average, and the fourth average. In other embodiments, third determination circuit 3415 can calculate the first average, the second average, the third average, and the fourth average in other ways. For example, third determination circuit 3415 can calculate the first average, the second average, the third average, and the fourth average using different weights from those used in equations (3).

Similar to first determination circuit 3413, third determination circuit 3415 sets the forty-five degree diagonal direction as the pattern direction where the first average is the smallest among the first average, the second average, the third average, and the fourth average, and generates third pattern direction signal PD3 with a first value. Third determination circuit 3415 sets the vertical direction as the pattern direction where the second average is the smallest among the first average, the second average, the third average, and the fourth average, and generates third pattern direction signal PD3 with a second value. Third determination circuit 3415 sets the one hundred thirty-five degree diagonal direction as the pattern direction where the third average is the smallest among the first average, the second average, the third average, and the fourth average, and generates third pattern direction signal PD3 with a third value. Third determination circuit 3415 sets the horizontal direction as the pattern direction where the fourth average is the smallest among the first average, the second average, the third average, and the fourth average, and generates third pattern direction signal PD3 with a fourth value.

Referring again to FIG. 7, multiplexer 3416 receives first pattern direction signal PD1 from first determination circuit 3413, second pattern direction signal PD2 from second determination circuit 3414, third pattern direction signal PD3 from third determination circuit 3415, and bad pixel location pattern signal BPP from controller 3411. Multiplexer 3416 outputs first pattern direction signal PD1 as pattern direction signal PD where bad pixel location pattern signal BPP has the first value. Multiplexer 3416 outputs second pattern direction signal PD2 as pattern direction signal PD where bad pixel location pattern signal BPP has the second value. Multiplexer 3416 outputs third pattern direction signal PD3 as pattern direction signal PD where bad pixel location pattern signal BPP has the third value.

Estimated value calculation circuit 3420 comprises a demultiplexer 3421, a first calculation circuit 3422, a second calculation circuit 3423, a third calculation circuit 3424, a fourth calculation circuit 3425, and a multiplexer 3426.

Demultiplexer 3421 receives the kernel from input control circuit 3300 and receives pattern direction signal PD from pattern direction determination circuit 3410. Demultiplexer 3421 provides the kernel to first calculation circuit 3422 where pattern direction signal PD has the first value. Demultiplexer 3421 provides the kernel to second calculation circuit 3423 where pattern direction signal PD has the second value. Demultiplexer 3421 provides the kernel to third calculation circuit 3424 where pattern direction signal PD has the third value. Demultiplexer 3421 provides the kernel to fourth calculation circuit 3425 where pattern direction signal PD has the fourth value.

First calculation circuit 3422 is activated where the pattern direction of the kernel is the forty-five degree diagonal direction. Second calculation circuit 3423 is activated where the pattern direction of the kernel is the vertical direction. Third calculation circuit 3424 is activated where the pattern direction of the kernel is the one hundred thirty-five degree diagonal direction. Fourth calculation circuit 3425 is activated where the pattern direction of the kernel is the horizontal direction.

First calculation circuit 3422, second calculation circuit 3423, third calculation circuit 3424, and fourth calculation circuit 3425 calculate a first candidate value CPD1, a second candidate value CPD2, a third candidate value CPD3, and a fourth candidate value CPD4, respectively, based on changes of values of normal pixel data located in the pattern direction among the plurality of neighbor pixel data, along the pattern direction. For example, first calculation circuit 3422, second calculation circuit 3423, third calculation circuit 3424, and fourth calculation circuit 3425 may calculate first candidate value CPD1, second candidate value CPD2, third candidate value CPD3, and fourth candidate value CPD4, respectively, by selecting reference pixel data having the same color as the current pixel data and located in the pattern direction from the current pixel data, and subtracting a difference between an average of values of normal pixel data adjacent to the reference pixel data in a direction perpendicular to the pattern direction and an average of values of normal pixel data adjacent to the current pixel data in a direction perpendicular to the pattern direction from a value of the reference pixel data.

That is, each of first calculation circuit 3422, second calculation circuit 3423, third calculation circuit 3424, and fourth calculation circuit 3425 selects the reference pixel data having the same color as the current pixel data and located in the pattern direction from the current pixel data. Then, each of first calculation circuit 3422, second calculation circuit 3423, third calculation circuit 3424, and fourth calculation circuit 3425 determines whether at least one unit of pixel data adjacent to the reference pixel data in a direction perpendicular to the pattern direction and pixel data adjacent to the current pixel data in a direction perpendicular to the pattern direction is bad pixel data.

Where at least one unit of pixel data adjacent to the reference pixel data in a direction perpendicular to the pattern direction and pixel data adjacent to the current pixel data in a direction perpendicular to the pattern direction is bad pixel data, each of first calculation circuit 3422, second calculation circuit 3423, third calculation circuit 3424, and fourth calculation circuit 3425 determines the value of the reference pixel data as first candidate value CPD1, second candidate value CPD2, third candidate value CPD3, and fourth candidate value CPD4, respectively.

Where all pixel data adjacent to the reference pixel data in a direction perpendicular to the pattern direction and pixel data adjacent to the current pixel data in a direction perpendicular to the pattern direction is normal pixel data, each of first calculation circuit 3422, second calculation circuit 3423, third calculation circuit 3424, and fourth calculation circuit 3425 determines first candidate value CPD1, second candidate value CPD2, third candidate value CPD3, and fourth candidate value CPD4, respectively, by subtracting the difference between the average of values of normal pixel data adjacent to the reference pixel data in a direction perpendicular to the pattern direction and the average of values of normal pixel data adjacent to the current pixel data in a direction perpendicular to the pattern direction from the value of the reference pixel data.

Hereinafter, operations of first calculation circuit 3422, second calculation circuit 3423, third calculation circuit 3424, and fourth calculation circuit 3425 will be described with reference to FIG. 9.

First calculation circuit 3422 selects one of pixel data P13 and P31 having the same color (i.e., green) as current pixel data P22 and located in the forty-five degree diagonal direction (i.e., in the pattern direction of the kernel) from current pixel data P22, as the reference pixel data. Where only pixel data P13 is normal pixel data, first calculation circuit 3422 selects pixel data P13 between pixel data P13 and P31. Where only pixel data P31 is normal pixel data, first calculation circuit 3422 selects pixel data P31 between pixel data P13 and P31. Where both pixel data P13 and P31 are normal pixel data, first calculation circuit 3422 selects one of pixel data P13 and P31 according to a predetermined order of priority.

Where first calculation circuit 3422 selects pixel data P13 as the reference pixel data, first calculation circuit 3422 determines whether at least one of pixel data P02 and P24, which are adjacent to reference pixel data P13 in the one hundred thirty-five degree diagonal direction (i.e., a direction perpendicular to the pattern direction) and pixel data P11 and P33, which are adjacent to current pixel data P22 in the one hundred thirty-five degree diagonal direction (i.e., a direction perpendicular to the pattern direction) is bad pixel data. Where at least one of pixel data P02, P24, P11, and P33 is bad pixel data, first calculation circuit 3422 determines the value of reference pixel data P13 as first candidate value CPD1, which is an estimated value of current pixel data P22. Where all of pixel data P02, P24, P11, and P33 are normal pixel data, first calculation circuit 3422 calculates first candidate value CPD1 by subtracting the difference between the average of values of normal pixel data P02 and P24, which are adjacent to reference pixel data P13 in the one hundred thirty-five degree diagonal direction (i.e., a direction perpendicular to the pattern direction), and the average of values of normal pixel data P11 and P33, which are adjacent to current pixel data P22 in the one hundred thirty-five degree diagonal direction (i.e., a direction perpendicular to the pattern direction), from the value of reference pixel data P13.

Where first calculation circuit 3422 selects pixel data P31 as the reference pixel data, first calculation circuit 3422 determines whether at least one of pixel data P20 and P42, which are adjacent to reference pixel data P31 in the one hundred thirty-five degree diagonal direction (i.e., a direction perpendicular to the pattern direction) and pixel data P11 and P33, which are adjacent to current pixel data P22 in the one hundred thirty-five degree diagonal direction (i.e., a direction perpendicular to the pattern direction) is bad pixel data. Where at least one of pixel data P20, P42, P11, and P33 is bad pixel data, first calculation circuit 3422 determines the value of reference pixel data P31 as first candidate value CPD1, which is an estimated value of current pixel data P22. Where all of pixel data P20, P42, P11, and P33 are normal pixel data, first calculation circuit 3422 calculates first candidate value CPD1 by subtracting the difference between the average of values of normal pixel data P20 and P42, which are adjacent to reference pixel data P31 in the one hundred thirty-five degree diagonal direction (i.e., a direction perpendicular to the pattern direction), and the average of values of normal pixel data P11 and P33, which are adjacent to current pixel data P22 in the one hundred thirty-five degree diagonal direction (i.e., a direction perpendicular to the pattern direction), from the value of reference pixel data P31.

For example, first calculation circuit 3422 calculates first candidate value CPD1 using the following equations (4) where first calculation circuit 3422 selects pixel data P13 as the reference pixel data, and first calculation circuit 3422 calculates first candidate value CPD1 using the following equations (5) where first calculation circuit 3422 selects pixel data P31 as the reference pixel data.

$$CPD1 = P13$$

(where at least one of pixel data P02, P24, P11, and P33 is bad pixel data)

$$CPD1 = P13 - ((P02+P24)/2 - (P11+P33)/2) \quad \text{Equations (4)}$$

(where all of pixel data P02, P24, P11 and P33 are normal pixel data)

$$CPD1 = P31$$

(where at least one of pixel data P20, P42, P11 and P33 is bad pixel data)

$$CPD1 = P31 - ((P20+P42)/2 - (P11+P33)/2) \quad \text{Equations (5)}$$

(where all of pixel data P20, P42, P11, and P33 are normal pixel data)

Equations (4) and (5) represent two examples of calculations that first calculation circuit 3422 can use to calculate first candidate value CPD1. In other embodiments, first calculation circuit 3422 can calculate first candidate value CPD1 in other ways. For example, first calculation circuit 3422 can calculate first candidate value CPD1 using different neighbor pixel data from that used in equations (4) and (5).

Second calculation circuit 3423 selects one of pixel data P02 and P42, which has a same color (i.e., green) as current pixel data P22 and is located in the vertical direction (i.e., the pattern direction of the kernel) from current pixel data P22, as the reference pixel data. Where only pixel data P02 is normal pixel data, second calculation circuit 3423 selects pixel data P02 between pixel data P02 and P42. Where only pixel data P42 is normal pixel data, second calculation circuit 3423 selects pixel data P42 between pixel data P02 and P42. Where both pixel data P02 and P42 are normal pixel data, second calculation circuit 3423 selects one of pixel data P02 and P42 according to a predetermined order of priority.

Where second calculation circuit 3423 selects pixel data P02 as the reference pixel data, second calculation circuit 3423 determines whether at least one of pixel data P01 and P03, which are adjacent to reference pixel data P02 in the horizontal direction (i.e., a direction perpendicular to the pattern direction) and pixel data P21 and P23, which are adjacent to current pixel data P22 in the horizontal direction (i.e., a direction perpendicular to the pattern direction) is bad pixel data. Where at least one of pixel data P01, P03, P21, and P23 is bad pixel data, second calculation circuit 3423 determines the value of reference pixel data P02 as second candidate value CPD2, which is an estimated value of current pixel data P22. Where all of pixel data P01, P03, P21, and P23 are normal pixel data, second calculation circuit 3423 calculates second candidate value CPD2 by subtracting the difference between the average of values of normal pixel data P01 and P03, which are adjacent to reference pixel data P02 in the horizontal direction (i.e., a direction perpendicular to the pattern direction), and the average of values of normal pixel data P21 and P23, which are adjacent to current pixel data P22 in the horizontal direction (i.e., a direction perpendicular to the pattern direction), from the value of reference pixel data P02.

Where second calculation circuit 3423 selects pixel data P42 as the reference pixel data, second calculation circuit 3423 determines whether at least one of pixel data P41 and P43, which are adjacent to reference pixel data P42 in the horizontal direction (i.e., a direction perpendicular to the pattern direction) and pixel data P21 and P23, which are adjacent to current pixel data P22 in the horizontal direction (i.e., a direction perpendicular to the pattern direction) is bad pixel data. Where at least one of pixel data P41, P43, P21, and P23 is bad pixel data, second calculation circuit 3423 determines the value of reference pixel data P42 as second candidate value CPD2, which is an estimated value of current pixel data P22. Where all of pixel data P41, P43, P21, and P23 are normal pixel data, second calculation circuit 3423 calculates second candidate value CPD2 by subtracting the difference between the average of values of normal pixel data P41 and P43, which are adjacent to reference pixel data P42 in the horizontal direction (i.e., a direction perpendicular to the pattern direction), and the average of values of normal pixel data P21 and P23, which are adjacent to current pixel data P22 in the horizontal direction (i.e., a direction perpendicular to the pattern direction), from the value of reference pixel data P42.

For example, second calculation circuit 3423 may calculate second candidate value CPD2 using the following equations (6) where second calculation circuit 3423 selects pixel data P02 as the reference pixel data, and second calculation circuit 3423 may calculate second candidate value CPD2 using the following equations (7) where second calculation circuit 3423 selects pixel data P42 as the reference pixel data.

$$CPD2=P02$$

(where at least one of pixel data P01, P03, P21, and P23 is bad pixel data)

$$CPD2=P02-((P01+P03)/2-(P21+P23)/2) \qquad \text{Equations (6)}$$

(where all of pixel data P01, P03, P21, and P23 are normal pixel data)

$$CPD2=P42$$

(where at least one of pixel data P41, P43, P21, and P23 is bad pixel data)

$$CPD2=P42-((P41+P43)/2-(P21+P23)/2) \qquad \text{Equations (7)}$$

(where all of pixel data P41, P43, P21, and P23 are normal pixel data)

Equations (6) and (7) represent two examples of calculations that second calculation circuit 3423 can use to calculate second candidate value CPD2. In other embodiments, second calculation circuit 3423 can calculate second candidate value CPD2 in other ways. For example, second calculation circuit 3423 can calculate second candidate value CPD2 using different neighbor pixel data from that used in equations (6) and (7).

Third calculation circuit 3424 selects one of pixel data P11 and P33, which has a same color (i.e., green color) as current pixel data P22 and is located in the one hundred thirty-five degree diagonal direction (i.e., the pattern direction of the kernel) from current pixel data P22, as the reference pixel data. Where only pixel data P11 is normal pixel data, third calculation circuit 3424 selects pixel data P11 between pixel data P11 and P33. Where only pixel data P33 is normal pixel data, third calculation circuit 3424 selects pixel data P33 between pixel data P11 and P33. Where both pixel data P11 and P33 are normal pixel data, third calculation circuit 3424 selects one of pixel data P11 and P33 according to a predetermined order of priority.

Where third calculation circuit 3424 selects pixel data P11 as the reference pixel data, third calculation circuit 3424 determines whether at least one of pixel data P02 and P20, which are adjacent to reference pixel data P11 in the forty-five degree diagonal direction (i.e., a direction perpendicular to the pattern direction) and pixel data P13 and P31, which are adjacent to current pixel data P22 in the forty-five degree diagonal direction (i.e., a direction perpendicular to the pattern direction) is bad pixel data. Where at least one of pixel data P02, P20, P13, and P31 is bad pixel data, third calculation circuit 3424 determines the value of reference pixel data P11 as third candidate value CPD3, which is an estimated value of current pixel data P22. Where all of pixel data P02, P20, P13, and P31 are normal pixel data, third calculation circuit 3424 calculates third candidate value CPD3 by subtracting the difference between the average of values of normal pixel data P02 and P20, which are adjacent to reference pixel data P11 in the forty-five degree diagonal direction (i.e., a direction perpendicular to the pattern direction), and the average of values of normal pixel data P13 and P31, which are adjacent to current pixel data P22 in the forty-five degree diagonal direction (i.e., a direction perpendicular to the pattern direction), from the value of reference pixel data P11.

Where third calculation circuit 3424 selects pixel data P33 as the reference pixel data, third calculation circuit 3424 determines whether at least one of pixel data P24 and P42, which are adjacent to reference pixel data P33 in the forty-five degree diagonal direction (i.e., a direction perpendicular to the pattern direction) and pixel data P13 and P31, which are adjacent to current pixel data P22 in the forty-five degree diagonal direction (i.e., a direction perpendicular to the pattern direction) is bad pixel data. Where at least one of pixel data P24, P42, P13, and P31 is bad pixel data, third calculation circuit 3424 determines the value of reference pixel data P33 as third candidate value CPD3, which is an estimated value of current pixel data P22. Where all of pixel data P24, P42, P13, and P31 are normal pixel data, third calculation circuit 3424 calculates third candidate value CPD3 by subtracting the difference between the average of values of normal pixel data P24 and P42, which are adjacent to reference pixel data P33 in the forty-five degree diagonal direction (i.e., a direction perpendicular to the pattern direction), and the average of values of normal pixel data P13 and P31, which are adjacent to current pixel data P22 in the forty-five diagonal direction (i.e., a direction perpendicular to the pattern direction), from the value of reference pixel data P33.

For example, third calculation circuit 3424 may calculate third candidate value CPD3 using the following equations (8) where third calculation circuit 3424 selects pixel data P11 as the reference pixel data, and third calculation circuit 3424 may calculate third candidate value CPD3 using the following equations (9) where third calculation circuit 3424 selects pixel data P33 as the reference pixel data.

$$CPD3=P11$$

(where at least one of pixel data P02, P20, P13, and P31 is bad pixel data)

$$CPD3=P11-((P02+P20)/2-(P13+P31)/2) \qquad \text{Equations (8)}$$

(where all of pixel data P02, P20, P13, and P31 are normal pixel data)

$$CPD3=P33$$

(where at least one of pixel data P24, P42, P13, and P31 is bad pixel data)

$$CPD3=P33-((P24+P42)/2-(P13+P31)/2) \qquad \text{Equations (9)}$$

(where all of pixel data P24, P42, P13, and P31 are normal pixel data)

Equations (8) and (9) are two examples of calculations that third calculation circuit 3424 can use to calculate third candidate value CPD3. In some other embodiments, third calculation circuit 3424 can calculate third candidate value CPD3 in other ways. For example, third calculation circuit 3424 can calculate third candidate value CPD3 using different neighbor pixel data from those used in equations (8) and (9).

Fourth calculation circuit 3425 selects one of pixel data P20 and P24, which has a same color (i.e., green color) as current pixel data P22 and is located in the horizontal direction (i.e., the pattern direction of the kernel) from current pixel data P22, as the reference pixel data. Where only pixel data P20 is normal pixel data, fourth calculation circuit 3425 selects pixel data P20 between pixel data P20 and P24. Where only pixel data P24 is normal pixel data, fourth calculation circuit 3425 selects pixel data P24 between pixel data P20 and P24. Where both pixel data P20 and P24 are normal pixel data, fourth calculation circuit 3425 selects one of pixel data P20 and P24 according to a predetermined order of priority.

Where fourth calculation circuit 3425 selects pixel data P20 as the reference pixel data, fourth calculation circuit 3425 determines whether at least one of pixel data P10 and P30, which are adjacent to reference pixel data P20 in the vertical direction (i.e., a direction perpendicular to the pattern direction) and pixel data P12 and P32, which are adjacent to current pixel data P22 in the vertical direction (i.e., a direction perpendicular to the pattern direction) is bad pixel data. Where at least one of pixel data P10, P30, P12, and P32 is bad pixel data, fourth calculation circuit 3425 determines the value of reference pixel data P20 as fourth candidate value CPD4, which is an estimated value of current pixel data P22. Where all of pixel data P10, P30, P12, and P32 are normal pixel data, fourth calculation circuit 3425 calculates fourth candidate value CPD4 by subtracting the difference between the average of values of normal pixel data P10 and P30, which are adjacent to reference pixel data P20 in the vertical direction (i.e., a direction perpendicular to the pattern direction), and the average of values of normal pixel data P12 and P32, which are adjacent to current pixel data P22 in the vertical direction (i.e., a direction perpendicular to the pattern direction), from the value of reference pixel data P20.

Where fourth calculation circuit 3425 selects pixel data P24 as the reference pixel data, fourth calculation circuit 3425 determines whether at least one of pixel data P14 and P34, which are adjacent to reference pixel data P24 in the vertical direction (i.e., a direction perpendicular to the pattern direction) and pixel data P12 and P32, which are adjacent to current pixel data P22 in the vertical direction (i.e., a direction perpendicular to the pattern direction) is bad pixel data. Where at least one of pixel data P14, P34, P12, and P32 is bad pixel data, fourth calculation circuit 3425 determines the value of reference pixel data P24 as fourth candidate value CPD4, which is an estimated value of current pixel data P22. Where all of pixel data P14, P34, P12, and P32 are normal pixel data, fourth calculation circuit 3425 calculates fourth candidate value CPD4 by subtracting the difference between the average of values of normal pixel data P14 and P34, which are adjacent to reference pixel data P24 in the vertical direction (i.e., a direction perpendicular to the pattern direction), and the average of values of normal pixel data P12 and P32, which are adjacent to current pixel data P22 in the vertical direction (i.e., a direction perpendicular to the pattern direction), from the value of reference pixel data P24.

For example, fourth calculation circuit 3425 may calculate fourth candidate value CPD4 using the following equations (10) where fourth calculation circuit 3425 selects pixel data P20 as the reference pixel data, and fourth calculation circuit 3425 may calculate fourth candidate value CPD4 using the following equations (11) where fourth calculation circuit 3425 selects pixel data P24 as the reference pixel data.

$$CPD4 = P20$$

(where at least one of pixel data P10, P30, P12, and P32 is bad pixel data)

$$CPD4 = P20 - ((P10+P30)/2 - (P12+P32)/2) \quad \text{Equations (10)}$$

(where all of pixel data P10, P30, P12, and P32 are normal pixel data)

$$CPD4 = P24$$

(where at least one of pixel data P14, P34, P12, and P32 is bad pixel data)

$$CPD4 = P24 - ((P14+P34)/2 - (P12+P32)/2) \quad \text{Equations (11)}$$

(where all of pixel data P14, P34, P12, and P32 are normal pixel data)

Equations (10) and (11) represent two examples of calculations that fourth calculation circuit 3425 can use to calculate fourth candidate value CPD4. In other embodiments, fourth calculation circuit 3425 can calculate fourth candidate value CPD4 in other ways. For example, fourth calculation circuit 3425 can calculate fourth candidate value CPD4 using different neighbor pixel data from that used in equations (10) and (11).

Referring again to FIG. 7, multiplexer 3426 receives first candidate value CPD1 from first calculation circuit 3422, second candidate value CPD2 from second calculation circuit 3423, third candidate value CPD3 from third calculation circuit 3424, fourth candidate value CPD4 from fourth calculation circuit 3425, and pattern direction signal PD from pattern direction determination circuit 3410. Multiplexer 3426 outputs first candidate value CPD1 as first estimated value EVALUE1 where pattern direction signal PD has the first value. Multiplexer 3426 outputs second candidate value CPD2 as the first estimated value EVALUE1 where pattern direction signal PD has the second value. Multiplexer 3426 outputs third candidate value CPD3 as first estimated value EVALUE1 where pattern direction signal PD has the third value. Multiplexer 3426 outputs fourth candidate value CPD4 as first estimated value EVALUE1 where pattern direction signal PD has the fourth value.

Figure 11:
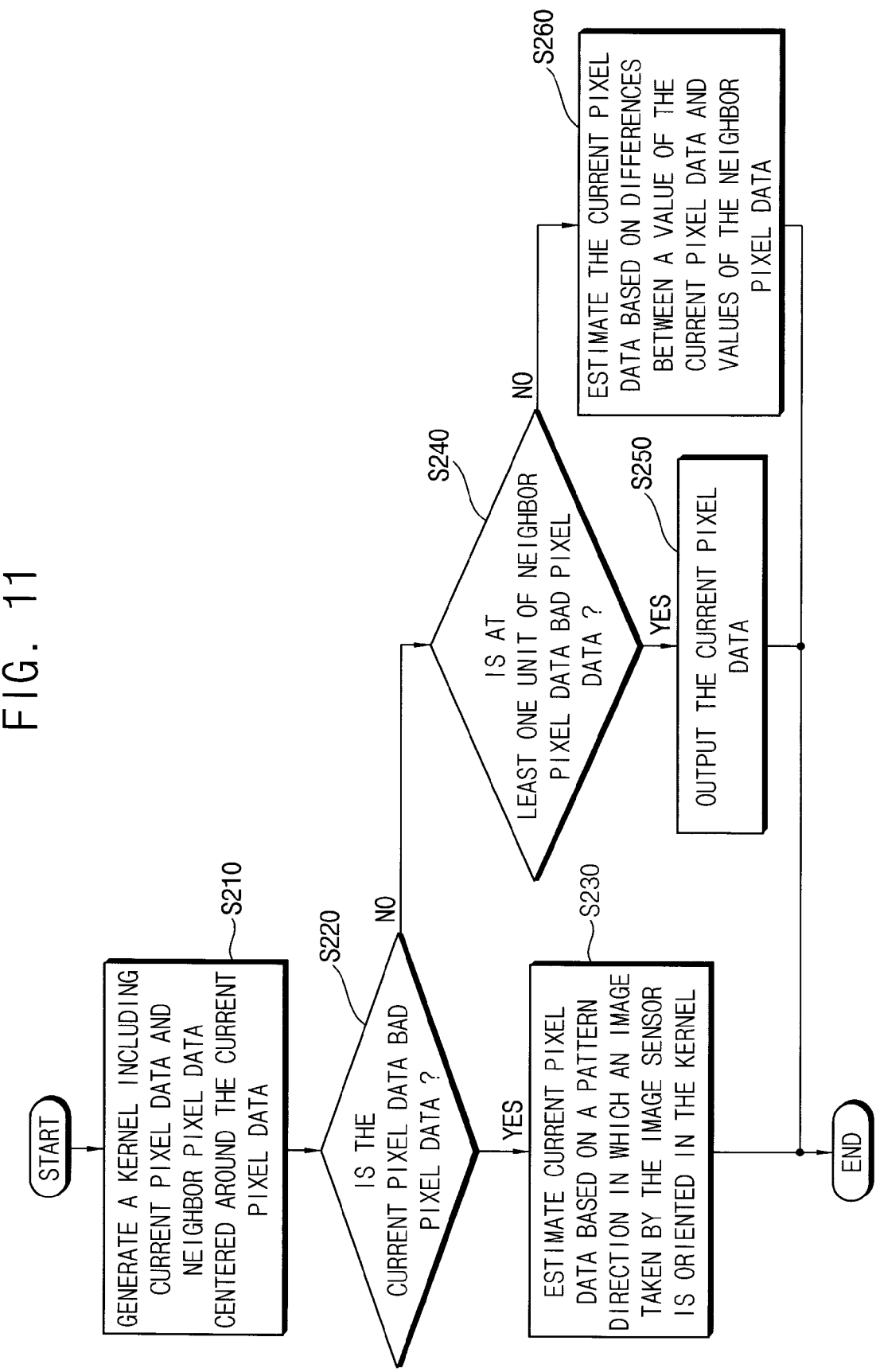
FIG. 11 is a flowchart illustrating a method of performing interpolation on bad pixel data using only normal pixel data according to an embodiment of the inventive concept.

FIG. 11 is a flowchart illustrating a method of performing an interpolation on bad pixel data using only normal pixel data according to an embodiment of the inventive concept. The method of FIG. 11 will be described with reference to image sensor 1000.

Image sensor 1000 comprises a pixel array comprising a plurality of pixels. The plurality of pixels in image sensor 1000 transform incident light into electric signals to generate input pixel data IDATA.

Bad pixel data indication circuit 2100 in bad pixel data determination unit 2000 determines whether each unit of input pixel data IDATA received from image sensor 1000 is bad pixel data or normal pixel data based on coordinates of bad pixels of image sensor 1000 stored in non-volatile memory device 2200 and adds bad pixel indication bit I_BAD to each unit of input pixel data IDATA to indicate whether it is bad pixel data or normal pixel data. As described with reference to FIG. 3, non-volatile memory device 2200 stores a coordinate of a bad pixel only where at least one more bad pixel is located in an area of n×n pixels centered around the bad pixel in image sensor 1000, and does not store a coordinate of a bad pixel where no additional bad pixel is located in the area of n×n pixels centered around the bad pixel in image sensor 1000.

Kernel generation unit 3100 generates the kernel comprising the current pixel data and the plurality of neighbor pixel data centered around the current pixel data (S210). Kernel generation unit 3100 consecutively generates different kernels by consecutively selecting different units of pixel data among the plurality of input pixel data as the current pixel data.

Input control circuit 3300 receives the kernel from kernel generation unit 3100 and determines whether the current pixel data and each of the plurality of neighbor pixel data is bad pixel data or normal pixel data based on bad pixel indication bit I_BAD added to the current pixel data and each of the plurality of neighbor pixel data (S220).

Where the current pixel data is bad pixel data (S220=Yes), input control circuit 3300 provides the kernel received from kernel generation unit 3100 to first estimation circuit 3400. Then, first estimation circuit 3400 estimates the current pixel data based on the pattern direction in which the image taken by image sensor 1000 is oriented in the kernel, and generates first estimated value EVALUE1 of the current pixel data (S230). The operation of first estimation circuit 3400 to calculate first estimated value EVALUE1 is described above with reference to FIGS. 7, 8A, 8B, 8C, 9, 10A, 10B, 10C, and 10D.

Where the current pixel data is normal pixel data (S220=No), input control circuit 3300 determines whether each of the plurality of neighbor pixel data is bad pixel data or normal pixel data (S240). Where at least one of the plurality of neighbor pixel data is bad pixel data (S240=Yes), input control circuit 3300 provides the kernel received from kernel generation unit 3100 to second estimation circuit 3500. Then, second estimation circuit 3500 outputs the current pixel data without any estimation as a second estimated value EVALUE2 of the current pixel data (S250).

Where all of the neighbor pixel data is normal pixel data (S240=No), input control circuit 3300 provides the kernel received from kernel generation unit 3100 to third estimation circuit 3600. Third estimation circuit 3600 then estimates the current pixel data based on differences between the value of the current pixel data and the values of the plurality of neighbor pixel data and generates a third estimated value EVALUE3 of the current pixel data (S260). For example, third estimation circuit 3600 may identify the current pixel data as bad pixel data where an average of the differences between the value of the current pixel data and the values of the plurality of neighbor pixel data is greater than or equal to a critical value, estimate the current pixel data using the plurality of neighbor pixel data, and generate third estimated value EVALUE3. Third estimation circuit 3600 determines the current pixel data as normal pixel data where the average of the differences between the value of the current pixel data and the values of the plurality of neighbor pixel data is smaller than the critical value, and outputs the current pixel data without any estimation as third estimated value EVALUE3.

Output control circuit 3700 outputs one of first estimated value EVALUE1, second estimated value EVALUE2, and third estimated value EVALUE3 as output pixel data ODATA in response to estimation circuit selection signal ECSS received from input control circuit 3300.

Figure 12:
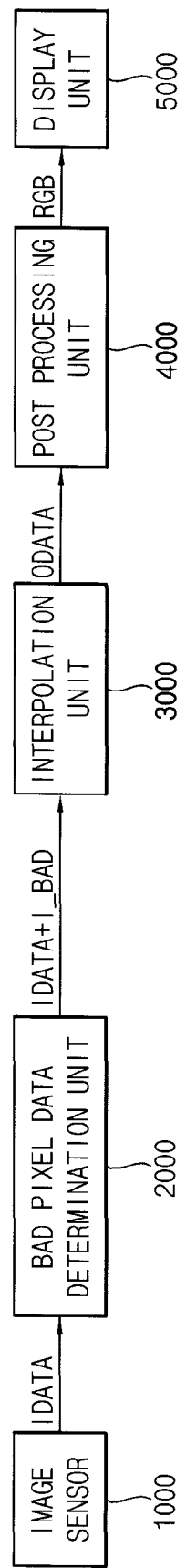
FIG. 12 is a block diagram illustrating an image capture device according to an embodiment of the inventive concept.

FIG. 12 is a block diagram illustrating an image capture device 20 according to an embodiment of the inventive concept.

Referring to FIG. 12, image capture device 20 comprises an image sensor 1000, a bad pixel data determination unit 2000, an interpolation unit 3000, a post processing unit 4000, and a display unit 5000.

Image sensor 1000 comprises a pixel array comprising a plurality of pixels. The plurality of pixels in image sensor 1000 transform incident light into electric signal to generate input pixel data IDATA.

Figure 13:
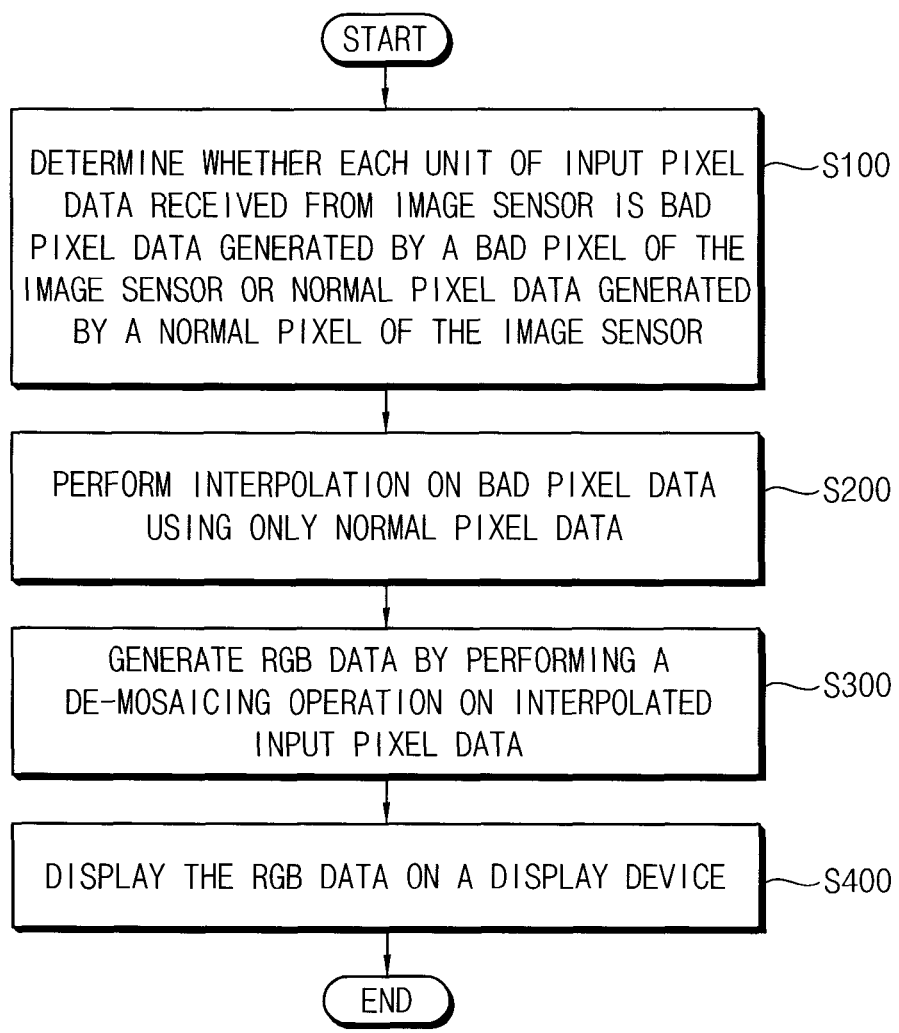
FIG. 13 is a flowchart illustrating a method of capturing an image according to an embodiment of the inventive concept.

FIG. 13 is a flowchart illustrating a method of capturing an image using image capture device 20 of FIG. 12 according to an embodiment of the inventive concept.

Referring to FIG. 13, bad pixel data determination unit 2000 determines whether each unit of input pixel data IDATA received from image sensor 1000 is bad pixel data generated by the bad pixel of image sensor 1000 or normal pixel data generated by the normal pixel of image sensor 1000, and adds bad pixel indication bit I_BAD to each unit of input pixel data IDATA to indicate whether it is bad pixel data or normal pixel data (S100). The operation of bad pixel data determination unit 2000 is described above with reference to FIGS. 2, 3, and 4.

Interpolation unit 3000 generates output pixel data ODATA by performing an interpolation on bad pixel data in input pixel data IDATA using only normal pixel data in input pixel data IDATA (S200). The operation of interpolation unit 3000 is described above with reference to FIGS. 5, 6A, 6B, 6C, 7, 8A, 8B, 8C, 9, 10A, 10B, 10C, and 10D.

Post processing unit 4000 generates RGB data by performing a de-mosaicing operation on output pixel data ODATA (S300).

Display unit 5000 displays the RGB data received from post processing unit 4000 (S400). Display unit 5000 comprises a display device such as a liquid crystal display (LCD) device or an organic light emitting display (OLED) device that displays the RGB data.

Methods of processing image signals according to the above-described embodiments can be used in image capture devices such as digital cameras, camcorders, personal digital assistants (PDAs), smart phones, cellular phones, laptop computers, and others.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of processing image signals, comprising:
   determining whether each of multiple units of input pixel data received from an image sensor is bad pixel data generated by a bad pixel of the image sensor or normal pixel data generated by a normal pixel of the image sensor; and
   performing interpolation to generate image data corresponding to the bad pixel using only normal pixel data and omitting bad pixel data;
   wherein each unit of the input pixel data is determined as bad pixel data or normal pixel data based on coordinates of bad pixels stored in a non-volatile memory device, and wherein the coordinates of the bad pixel are stored in the non-volatile memory device upon determining that at least one additional bad pixel is located in an area of n×n pixels centered on the bad pixel, where n is an odd number greater than or equal to three.

2. The method of claim 1, further comprising:
   adding a bad pixel indication bit to each unit of the input pixel data determined to be bad pixel data.

3. The method of claim 1, wherein performing the interpolation comprises:
   generating a kernel comprising a unit of current pixel data and a multiple units of neighbor pixel data centered around the current pixel data, wherein the current pixel data and the neighbor pixel data are part of the input pixel data; and
   generating a replacement pixel value for the current pixel data using the neighboring pixel data upon determining that the current pixel data is bad pixel data.

4. The method of claim 3, wherein generating the kernel comprises:
buffering the input pixel data in a storage circuit; and
selecting an n×n region of input pixel data from among the buffered input pixel data such that the current pixel data is located at the center of the selected n×n region of input pixel data, where n is an odd number greater than or equal to three.

5. The method of claim 3, wherein generating the replacement pixel value comprises:
where the current pixel data is bad pixel data, estimating the current pixel data based on a pattern direction in which an image taken by the image sensor is oriented in the kernel.

6. The method of claim 5, wherein generating the replacement pixel value further comprises:
where the current pixel data is normal pixel data, estimating the current pixel data based on whether at least one unit of the neighbor pixel data is bad pixel data.

7. The method of claim 6, wherein estimating the current pixel data based on whether at least one unit of the neighbor pixel data is bad pixel data comprises:
outputting the current pixel data where at least one unit of the neighbor pixel data is bad pixel data; and
estimating the current pixel data based on differences between a value of the current pixel data and values of the neighbor pixel data where all of the neighbor pixel data is normal pixel data.

8. The method of claim 7, wherein estimating the current pixel data based on the differences between the value of the current pixel data and the values of the neighbor pixel data comprises:
estimating the current pixel data using the neighbor pixel data where an average of the differences between the value of the current pixel data and the values of the neighbor pixel data is greater than or equal to a critical value; and
outputting the current pixel data where the average of the differences between the value of the current pixel data and the values of the neighbor pixel data is less than the critical value.

9. The method of claim 5, wherein estimating the current pixel data based on the pattern direction in which the image taken by the image sensor is oriented in the kernel comprises:
determining the pattern direction based on differences between values of the neighbor pixel data; and
calculating an estimated value of the current pixel data using only normal pixel data located in the pattern direction among the neighbor pixel data.

10. The method of claim 9, wherein determining the pattern direction based on the differences between the values of the neighbor pixel data comprises:
determining a bad pixel location pattern that represents where bad pixel data among the neighbor pixel data is located in the kernel;
selecting neighbor pixel data that is not located in the bad pixel location pattern among the neighbor pixel data; and
deciding the pattern direction such that an average of differences between values of pixel data located in the pattern direction among the selected neighbor pixel data is minimized.

11. The method of claim 10, wherein the bad pixel location pattern is determined as one of an adjacent pattern, a horizontal-vertical pattern, and a diagonal pattern.

12. The method of claim 11, wherein the bad pixel location pattern is determined as the adjacent pattern where bad pixel data is located within a predetermined distance from the current pixel data;
wherein the bad pixel location pattern is determined as the horizontal-vertical pattern where bad pixel data is located at least the predetermined distance apart in a horizontal direction or in a vertical direction from the current pixel data; and
wherein the bad pixel location pattern is determined as the diagonal pattern where bad pixel data is located at least the predetermined distance apart in a diagonal direction from the current pixel data.

13. The method of claim 10, wherein deciding the pattern direction comprises:
calculating a first average of differences between values of pixel data located in a first diagonal direction among the selected neighbor pixel data;
calculating a second average of differences between values of pixel data located in a vertical direction among the selected neighbor pixel data;
calculating a third average of differences between values of pixel data located in a second diagonal direction perpendicular to the first diagonal direction, among the selected neighbor pixel data;
calculating a fourth average of differences between values of pixel data located in a horizontal direction among the selected neighbor pixel data;
setting the first diagonal direction as the pattern direction where the first average is smaller than the second, third, and fourth averages;
setting the vertical direction as the pattern direction where the second average is smaller than the first, third, and fourth averages;
setting the second diagonal direction as the pattern direction where the third average is smaller than the first, second, and fourth averages; and
setting the horizontal diagonal direction as the pattern direction where the fourth average is smaller than the first, second, and third averages.

14. The method of claim 13, wherein each of the first average, the second average, the third average, and the fourth average is calculated using a weighted sum in which a relatively large weight is placed on differences between values of pixel data relatively close to the current pixel data and a relatively small weight is placed on differences between values of pixel data relatively distant from the current pixel data.

15. The method of claim 9, wherein the estimated value of the current pixel data is calculated by selecting a unit of reference pixel data having a same color as the current pixel data and located in the pattern direction from the current pixel data, and subtracting a difference between an average of values of normal pixel data adjacent to the reference pixel data in a direction perpendicular to the pattern direction and an average of values of normal pixel data adjacent to the current pixel data in a direction perpendicular to the pattern direction from a value of the reference pixel data.

16. The method of claim 9, wherein calculating the estimated value of the current pixel data using only normal pixel data located in the pattern direction among the neighbor pixel data comprises:
selecting a reference pixel data having a same color as the current pixel data and located in the pattern direction from the current pixel data;
determining a value of the reference pixel data as the estimated value of the current pixel data where at least one of pixel data adjacent to the reference pixel data in a direction perpendicular to the pattern direction and pixel data adjacent to the current pixel data in a direction perpendicular to the pattern direction is bad pixel data; and determining the estimated value of the current pixel data by subtracting a difference between an average of values of normal pixel data adjacent to the reference pixel data in the direction perpendicular to the pattern direction and an average of values of normal pixel data adjacent to the current pixel data in the direction perpendicular to the pattern direction from a value of the reference pixel data where all pixel data adjacent to the reference pixel data in a direction perpendicular to the pattern direction and pixel data adjacent to the current pixel data in a direction perpendicular to the pattern direction are normal pixel data.

17. A method of capturing an image, comprising:

determining whether each of multiple units of input pixel data received from an image sensor is bad pixel data generated by a bad pixel of the image sensor or normal pixel data generated by a normal pixel of the image sensor;

performing interpolation to generate interpolated data corresponding to the bad pixel using only normal pixel data, and combining the interpolated data with the input pixel data to form interpolated input pixel data; and generating red-green-blue (RGB) data by performing a de-mosaicing operation on the interpolated input pixel data;

wherein each unit of the input pixel data is determined as bad pixel data or normal pixel data based on coordinates of bad pixels stored in a non-volatile memory device, and wherein the coordinates of the bad pixels are stored in the non-volatile memory device upon determining that at least one additional bad pixel is located in an area of n×n pixels centered on the bad pixel, where n is an odd number greater than or equal to three.

18. A method of processing image signals, comprising:

generating a kernel comprising current pixel data and a plurality of neighbor pixel data centered around the current pixel data;

determining whether the current pixel data is bad pixel data; and, upon determining that the current pixel data is bad pixel data, estimating the current pixel data using only normal pixel data based on a pattern direction in which an image is oriented in the kernel;

wherein each unit of the current pixel data and neighbor pixel data is determined as bad pixel data or normal pixel data based on coordinates of bad pixels stored in a non-volatile memory device, and wherein the coordinates of a bad pixel are stored in the non-volatile memory device upon determining that at least one additional bad pixel is located in an area of n×n pixels centered on the bad pixel, where n is an odd number greater than or equal to three.

* * * * *